United States Patent
Song et al.

(10) Patent No.: US 11,481,500 B2
(45) Date of Patent: Oct. 25, 2022

(54) SYSTEM AND METHOD TO CHECK AUTOMATION SYSTEM PROJECT SECURITY VULNERABILITIES

(71) Applicant: Siemens Corporation, Iselin, NJ (US)

(72) Inventors: Zhen Song, Austin, TX (US); Rizwan Majeed, Monmouth Junction, NJ (US); Arquimedes Martinez Canedo, Plainsboro, NJ (US); Guannan Ren, Monmouth Junction, NJ (US); Gustavo Arturo Quiros Araya, Princeton, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 407 days.

(21) Appl. No.: 16/646,190

(22) PCT Filed: Aug. 31, 2018

(86) PCT No.: PCT/US2018/049093
§ 371 (c)(1),
(2) Date: Mar. 11, 2020

(87) PCT Pub. No.: WO2019/055235
PCT Pub. Date: Mar. 21, 2019

(65) Prior Publication Data
US 2020/0272743 A1  Aug. 27, 2020

Related U.S. Application Data

(60) Provisional application No. 62/558,540, filed on Sep. 14, 2017.

(51) Int. Cl.
*G06N 20/00* (2019.01)
*G06F 16/951* (2019.01)
(Continued)

(52) U.S. Cl.
CPC .............. *G06F 21/577* (2013.01); *G06F 8/77* (2013.01); *G06F 11/3672* (2013.01);
(Continued)

(58) Field of Classification Search
None
See application file for complete search history.

(56) References Cited

U.S. PATENT DOCUMENTS

2008/0276102 A1  11/2008  MacKay et al.
2012/0072968 A1*  3/2012  Wysopal ............... G06F 21/577
                                                    726/1

(Continued)

FOREIGN PATENT DOCUMENTS

CN  202652255 U  1/2013
CN  103999089 A  8/2014

(Continued)

OTHER PUBLICATIONS

Nunes, "Darknet and Deepnet Mining for Proactive Cybersecurity Threat Intelligence", 2016, IEEE (Year: 2016).*

(Continued)

*Primary Examiner* — Hossain M Morshed

(57) ABSTRACT

A system for checking security vulnerabilities for automation system design includes a security database, an Internet crawler application, and security service application. The security database stores descriptions of known software vulnerabilities related to an automation system. The Internet crawler application is configured to systematically browse the Internet to find new software vulnerabilities related to the automation system and index the new software vulnerability into the security database. The security service application retrieves, from the security database, potential software vulnerabilities related to a hardware/software configuration of the automation system. The security service
(Continued)

application also identifies policies related to the potential vulnerabilities. Each policy describes a potential vulnerability and action to be performed in response to detection of the potential vulnerabilities. The security service applies the policies to the hardware/software configuration and software code corresponding to an automation application to identify actual vulnerabilities that can be displayed to a user.

20 Claims, 5 Drawing Sheets

(51) Int. Cl.
*G06F 8/77* (2018.01)
*G06N 5/04* (2006.01)
*G06F 21/57* (2013.01)
*G06F 11/36* (2006.01)

(52) U.S. Cl.
CPC ............ *G06F 16/951* (2019.01); *G06N 5/04* (2013.01); *G06N 20/00* (2019.01); *G06F 2221/033* (2013.01)

(56) References Cited

U.S. PATENT DOCUMENTS

| | | | |
|---|---|---|---|
| 2013/0167238 A1* | 6/2013 | Russell | G06F 21/577 726/25 |
| 2015/0172308 A1 | 6/2015 | Borohovski et al. | |
| 2016/0050225 A1* | 2/2016 | Carpenter | G06F 21/577 726/25 |
| 2017/0048267 A1 | 2/2017 | Yampolskiy et al. | |
| 2018/0096153 A1* | 4/2018 | DeWitte | G06Q 10/0635 |
| 2020/0412767 A1* | 12/2020 | Crabtree | H04L 63/1441 |

FOREIGN PATENT DOCUMENTS

| | | |
|---|---|---|
| CN | 104077531 A | 10/2014 |
| CN | 104881607 A | 9/2015 |

OTHER PUBLICATIONS

Examination Report dated Aug. 30, 2021; Application No. 201880059358.8; 12 pages.
International Search Report dated Aug. 31, 2018; Application No. PCT/US2018/049093; 12 pages.
Nunes Eric et al: "Darknet and deepnet mining for proactive cybersecurity threat intelligence", 2016 IEEE Conference on Intelligence and Security Informatics (ISI), IEEE, Sep. 28, 2016 (Sep. 28, 2016), pp. 7-12, XP033005748 / Sep. 28, 2016.

* cited by examiner

SYSTEM AND METHOD TO CHECK AUTOMATION SYSTEM PROJECT SECURITY VULNERABILITIES

CROSS-REFERENCE TO RELATED APPLICATIONS

This application is a national phase filing under 35 U.S.C. § 371 of International Patent Application No. PCT/US2018/049093, filed Aug. 31, 2018, which claims the benefit of priority to U.S. Provisional Patent Application Ser. No. 62/558,540, filed Sep. 14, 2017, which are incorporated herein by reference in their entirety.

GOVERNMENT RIGHTS STATEMENT REGARDING FEDERALLY SPONSORED RESEARCH OR DEVELOPMENT

This invention was made with government support under award no: N00173-17-2-0005 The government has certain rights in the invention.

TECHNICAL FIELD

The present disclosure relates generally to methods, systems, and apparatuses related to checking project security vulnerabilities for automation system design. The disclosed techniques may be applied to, for example, graphical project design tools such as Siemens Totally Integrated Automation (TIA) Portal.

BACKGROUND

An industry control system (ICS) is a control system and associated instrumentation used for industrial process control within an automation system. Due to the significant value of the physical systems they control, ICSs are subject to cyber-attacks, including web server attacks, sensor tempering, malicious code injections, and other methods. Stuxnet is a notable example on cyber-attacks targeted to automation systems. These attacks can cause major failures, outages, or even damage to property and humans.

Conventional ICSs have known security vulnerabilities. The term "security vulnerability" refers to any weakness with the hardware/software (HW/SW) configuration or source code of an application that can be exploited by an action to perform unauthorized actions within the automation system or any associated computer system. As used herein, a security vulnerability may encompass security issues, vulnerabilities, and exploits.

Several publicly available resources document the security vulnerabilities that could affect ICS. For example, the ICS Cyber Emergency Response Team (ICS-CERT) database from the Department of Homeland Security (DHS) issue alerts on critical infrastructure networks. One example of Siemens S7-1500 PLC vulnerability is shown in FIGS. 1A and 1B. FIG. 1A shows an advisory regarding a CPU Denial of Service attack, while FIG. 1B provides an example listing of other vulnerabilities with Siemens products.

Despite the availability of resources such as the ICS-CERT database, there is a general lack of support to the automation engineer in terms of cyber-security awareness. For example, automation engineers typically do not have an information technology (IT) security background. Conversely, IT security experts usually cannot apply standard IT security methodologies to ICS.

Moreover, due to the complexity of the automation systems, it is difficult to manually verify system security. Existing ICS security standards require an enduring manual process. The existing ICS security standards, such as International Electrotechnical Commission (IEC) 62443, are methods, not software tools. The process is time consuming and takes from days to weeks from beginning to completion. Also, the information in public security databases (e.g., CERT) is not processed automatically. It should also be noted that existing ICS security standards are only high-level guidelines. Therefore, the result is not detailed enough for automation engineers to improve their control logic, such as Structured Control Language (SCL) code.

SUMMARY

Embodiments of the present invention address and overcome one or more of the above shortcomings and drawbacks, by providing methods, systems, and apparatuses related to checking project security vulnerabilities for automation system design.

According to some embodiments, a system for checking project security vulnerabilities for automation system design includes a security database, an Internet crawler application, and a security service application. The security database stores descriptions of known software vulnerability related to an automation system. The Internet crawler application is configured to systematically browse the Internet to find new software vulnerabilities related to the automation system and index the new software vulnerability into the security database. The security service application retrieves, from the security database, potential software vulnerabilities related to a hardware/software configuration of the automation system. The security service application also identifies policies related to the potential vulnerabilities. Each policy describes a potential vulnerability and action to be performed in response to detection of the potential vulnerabilities. The security service applies the policies to the hardware/software configuration and software code corresponding to an automation application to identify one or more actual vulnerabilities. Then, the security service application displays actual vulnerabilities to a user.

According to other embodiments, computer-implemented method for checking project security vulnerabilities for automation system design includes receiving, from an IDE, a description of a hardware/software configuration of the automation system and software code corresponding to an automation application. One or more potential software vulnerabilities related to the hardware/software configuration are retrieved from a security database. One or more policies related to the potential vulnerabilities are identified. Each policy describes a potential vulnerability and one or more actions that may be performed to mitigate the potential vulnerabilities. The policies are applied to the hardware/software configuration and the software code to identify one or more actual vulnerabilities. These actual vulnerabilities may then be displayed in the IDE.

According to other embodiments, an Integrated Development Environment (IDE) system includes an IDE and a client application. The IDE comprises a first graphical user interface (GUI) component allowing specification of a hardware/software configuration of an automation system. The IDE further comprises a second GUI component allowing entry of software code corresponding to an automation application. The client application is integrated with the IDE. This application is configured to transfer, to a remote security service application, the hardware/software configuration and the software code. The client application receives, from the remote security service application, an identification of one or more vulnerabilities present in the software code. These vulnerabilities may then be displayed in the IDE.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures:

Figures 1A, 1B:
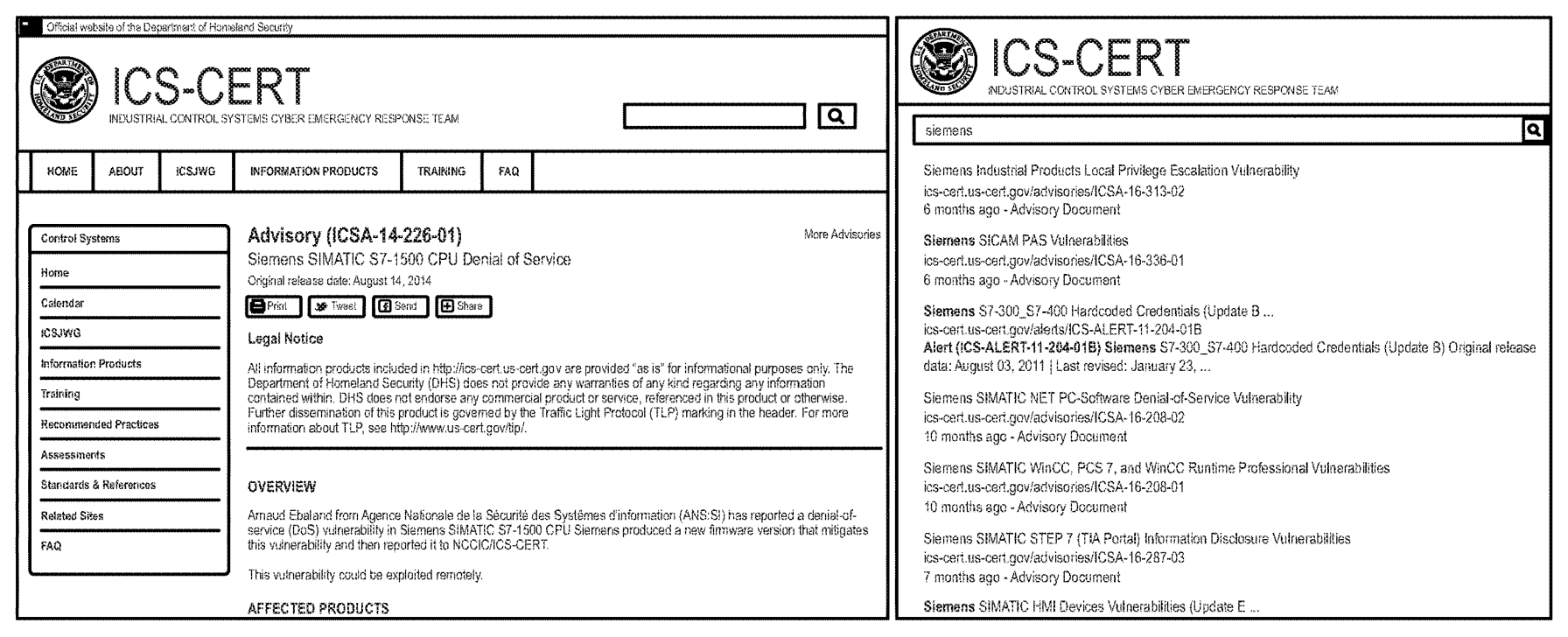

FIG. 1A shows an advisory regarding a CPU Denial of Service attack;

FIG. 1B provides an example listing of other vulnerabilities with Siemens products;

DETAILED DESCRIPTION

Systems, methods, and apparatuses are described herein which relate generally to the checking of project security vulnerabilities for automation system design. Briefly, the techniques described herein use a security vulnerability client application integrated with an integrated development environment (IDE) or operated in conjunction with the IDE. The security vulnerability client application communicates with a remote security vulnerability identification service to identify security vulnerabilities within HW/SW configurations and/or source code entered by a programmer. Once these security vulnerabilities are identified they are then communicated back to the client application for display to the user. As described below, in some embodiments, the remote security vulnerability identification service may also provide a listing of one or more mitigation techniques for addressing the identified security vulnerabilities.

Figure 2:
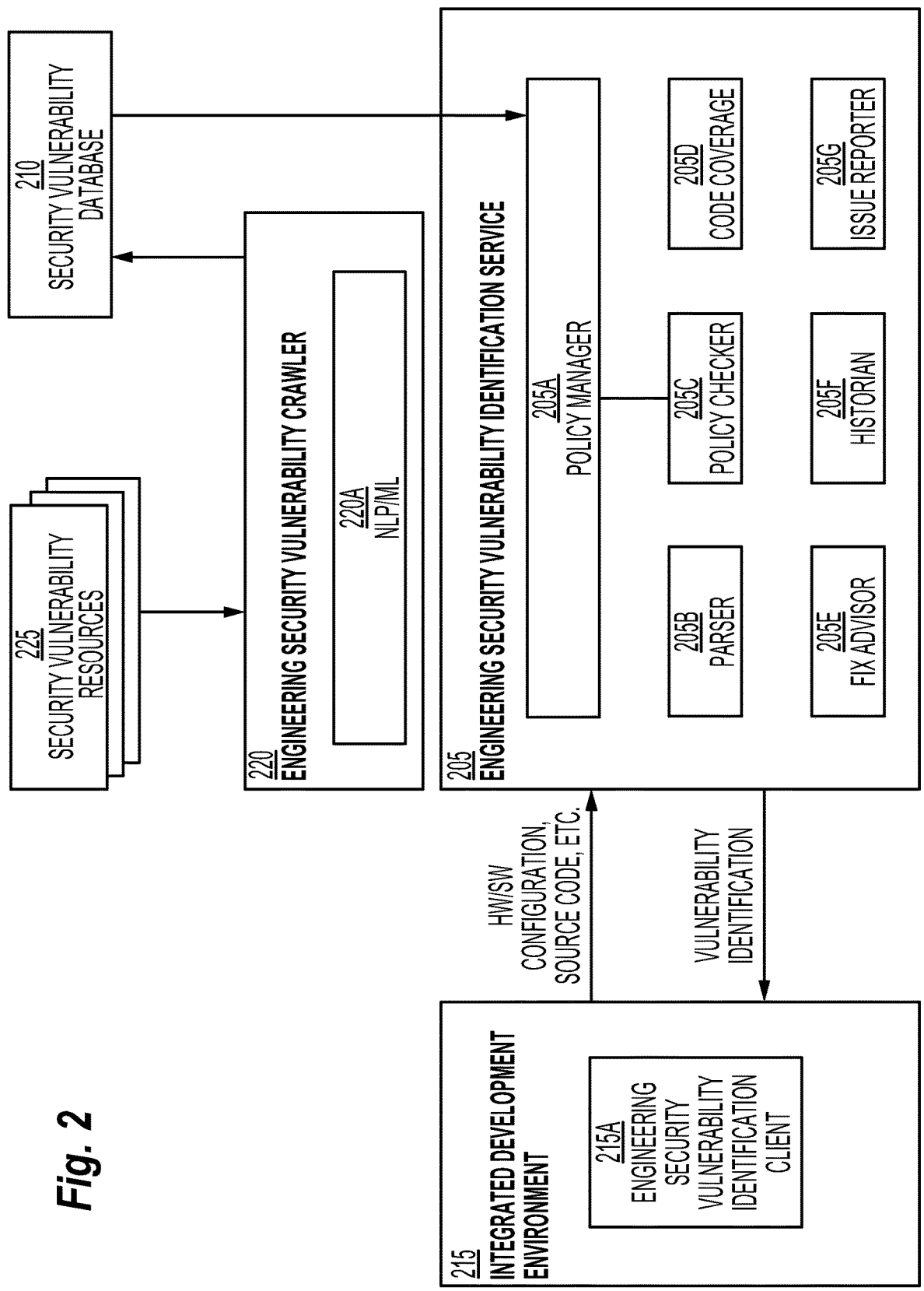
FIG. 2 illustrates a system for checking project security vulnerabilities for automation system design, according to some embodiments.

FIG. 2 illustrates a system for checking project security vulnerabilities for automation system design, according to some embodiments. Engineering Security Vulnerability Crawler 220 is an Internet crawler application configured to systematically browse Security Vulnerability Resources 225 on the Internet to find new software vulnerabilities related to the automation systems. Once the Engineering Security Vulnerability Crawler 220 identifies a new software vulnerability, the vulnerability is stored in a Security Vulnerability Database 210. In addition to this automatic processing, in some embodiments, users can manually populate the Security Vulnerability Database 210 with vulnerabilities as they are identified.

Security Vulnerability Resources 225 are websites that include one or more webpages identifying software vulnerabilities related to automation systems. For example, in one embodiment, the Security Vulnerability Resources 225 may include official resources such as the ICS-CERT database from the DHS. The Security Vulnerability Resources 225 may also include online forums and known "hacker" sites where security vulnerabilities are discussed or described. In some embodiments, Engineering Security Vulnerability Crawler 220 (described below) may perform searches of the entire Internet using keywords directed at particular automation systems (e.g., product names, versions, etc.) to identify websites that should be included in the Security Vulnerability Resources 225.

The Security Vulnerability Database 210 may be implemented using various database systems generally known in the art. For example, in some embodiments, a SQL-based database may be used. In other embodiments, the descriptions of known software vulnerabilities may be stored in a No-SQL database which has a table equivalent structure. As is understood in the art, the term "No-SQL" is used to define a class of data stores that are non-relational in their design. There are various types of No-SQL databases which may be generally grouped according to their underlying data model. These groupings may include databases that use column-based data models (e.g., Cassandra), document-based data models (e.g., MongoDB), key-value based data models (e.g., Redis), and/or graph-based data models (e.g., Allego). Any type of No-SQL database may be used to implement the various embodiments described herein. For example, in one embodiment, MongoDB software is used to provide the underlying functionality of the database used by the systems described herein.

The Engineering Security Vulnerability Crawler 220 comprises a Machine Learning Model 220A that processes the webpages and other information gathered from the Security Vulnerability Resources 225 to extract relevant information for storage in the Security Vulnerability Database 210. In some embodiments, the Machine Learning Model 220A is a natural language processing (NLP) component. The NLP component analyzes the webpages and other information gathered from the Security Vulnerability Resources 225 that are described in natural language and processes them in order to make the information understandable to the Engineering Security Vulnerability Identification Service 205 (described below). The NLP component may include, for example, a natural language parser and a named entity linker composes the main processing pipeline.

Figure 3:
FIG. 3 shows an example webpage retrieved from the ICS-CERT website.

The Engineering Security Vulnerability Crawler 220 may continuously scan the Internet for vulnerabilities and only trigger storage of the information when certain terms are identified by the Machine Learning Model 220A. For example, in one embodiment, the Machine Learning Model 220A is trained to identify one or more of the fields: names of particular product(s); version numbers for the product(s); vulnerability type(s); vulnerability names or other identifiers; and named entity extraction and entity linking units. Techniques for training and using machine learning models are generally understood by those skilled in the art; thus these techniques are not described in detail herein. FIG. 3 shows an example webpage retrieved from the ICS-CERT website. Boxes 305, 310 highlight the information that could be extracted from the webpage by the Machine Learning Model 220A Continuing with reference to FIG. 2, Engineering Security Vulnerability Identification Service 205 is a software application that executes, for example, in a private or public cloud-based computing system. Briefly, the Engineering Security Vulnerability Identification Service 205 receives a HW/SW configuration and software code provided by a user via an IDE 215. The Parser 205B applies a NLP model to parse the source code and HW/SW configuration into its component parts of natural language text which helps in the next identification steps related to software weaknesses. The Engineering Security Vulnerability Identification Service 205 retrieves potential security vulnerabilities related to the HW/SW configuration from the Security Vulnerability Database 210. Then, the source code is analyzed to determine if any of the vulnerabilities are present in the code.

The Policy Manager 205A manages policies that indicate what actions to take when a security vulnerability is detected in the code. In this way a "policy" can be understood as a rule that links a security vulnerability to an action. This action can be, for example, displaying an alert for a user or suggesting a way to mitigate the vulnerability in the code. For the latter case, the Fix Advisor 205E component may be used to suggest a possible mitigation technique for a particular security vulnerability found in a given HW/SW configuration or the source code. For example, the policy may indicate that a particular vulnerability related to use of an outdated version of a particular library may be mitigated by installing an updated version of the library or linking to the updated version. In some cases the mitigation actions may be provided in the information retrieved from the Security Vulnerability Resources 225; in other instances, the Policy Manager 205A may record how users mitigate security vulnerabilities and use that knowledge to generate policies. The Policy Checker 205C uses the information stored in the Policy Manager 205A to identify security vulnerabilities in the source code and/or SW/HW configuration after it is processed by the Parser 205B.

The Code Coverage 205D component measures the degree to which the software block code is tested by Policy Checker 205C. This may be performed, for example, by quantifying the size of the code according to some metric and then keeping track of what code is checked. As a simple example, consider an application with 1000 lines of code. After processing 100 lines of the source code, the Code Coverage 205D component would indicate that the code was 10% checked, after processing 200 lines of code, it would indicate the code was 20% checked, etc.

Historian 205F records trends and historical data related to software security vulnerability identification process which might help in quick fixing of similar future incidents. For example, if a user tries several different mitigation techniques for addressing a security vulnerability before finding the optimal mitigation strategy, this information may be recorded and used by the Fix Advisor 205E to give a preference to the optimal mitigation strategy in the figure when mitigation options are presented to a user.

Issue Reporter 205G reports any issues found while executing the service for a given project HW/SW configuration. Conceptually, the Issue Reporter 205G can be understood to be a means for outputting any errors that occur to operation of the Engineering Security Vulnerability Identification Service 205. In some embodiments, the Issue Reporter 205G stores issues locally in a data file that can be reviewed during maintenance of the Engineering Security Vulnerability Identification Service 205. In other embodiments, the issues can be streamed to the Engineering Security Vulnerability Identification Client 215A (described below) as the issues occur.

IDE 215 is a software application that allows computer programmers to develop automation applications. The IDE 215 may include, for example, a source code editor and debugging tools. Additionally, the IDE 215 may include one or more extensions (or "plug-ins") that adds specific features to the IDE 215. The example of FIG. 2 shows one extension: Engineering Security Vulnerability Identification Client 215A. The Engineering Security Vulnerability Identification Client 215A is the software component that integrates the IDE 215 with the Engineering Security Vulnerability Identification Service 205 over a network connection (e.g., via the Internet). Thus, as the user enters a HW/SW configuration this information is passed to the Engineering Security Vulnerability Identification Service 205. In turn, this triggers Policy Manager 205A as discussed above. Similarly, as the user enters code in the source code editor of the 215, this information is passed by the Engineering Security Vulnerability Identification Client 215A to the Engineering Security Vulnerability Identification Service 205. In some embodiments, the entirety of the source code is passed to the Engineering Security Vulnerability Identification Service 205 in response to some action performed by the user with the Engineering Security Vulnerability Identification Client 215A (e.g., clicking a button). In other embodiments, the Engineering Security Vulnerability Identification Client 215A transmits the source code to the Engineering Security Vulnerability Identification Service 205 as it is entered. For example, the Engineering Security Vulnerability Identification Client 215A may execute a loop that periodically (e.g., 1 second) checks for changes in the source code editor and, if any changes exist, transmits those changes to the Engineering Security Vulnerability Identification Service 205.

As vulnerabilities are identified by the Engineering Security Vulnerability Identification Service 205, they are sent to the Engineering Security Vulnerability Identification Client 215A for display in the IDE 215. Data may be transferred between the Engineering Security Vulnerability Identification Service 205 and the Engineering Security Vulnerability Identification Client 215A using any technique known in the art. For example, in some embodiments, a text format such as Extensible Markup Language (XML) or JavaScript Object Notation (JSON) may be used.

Figure 4:
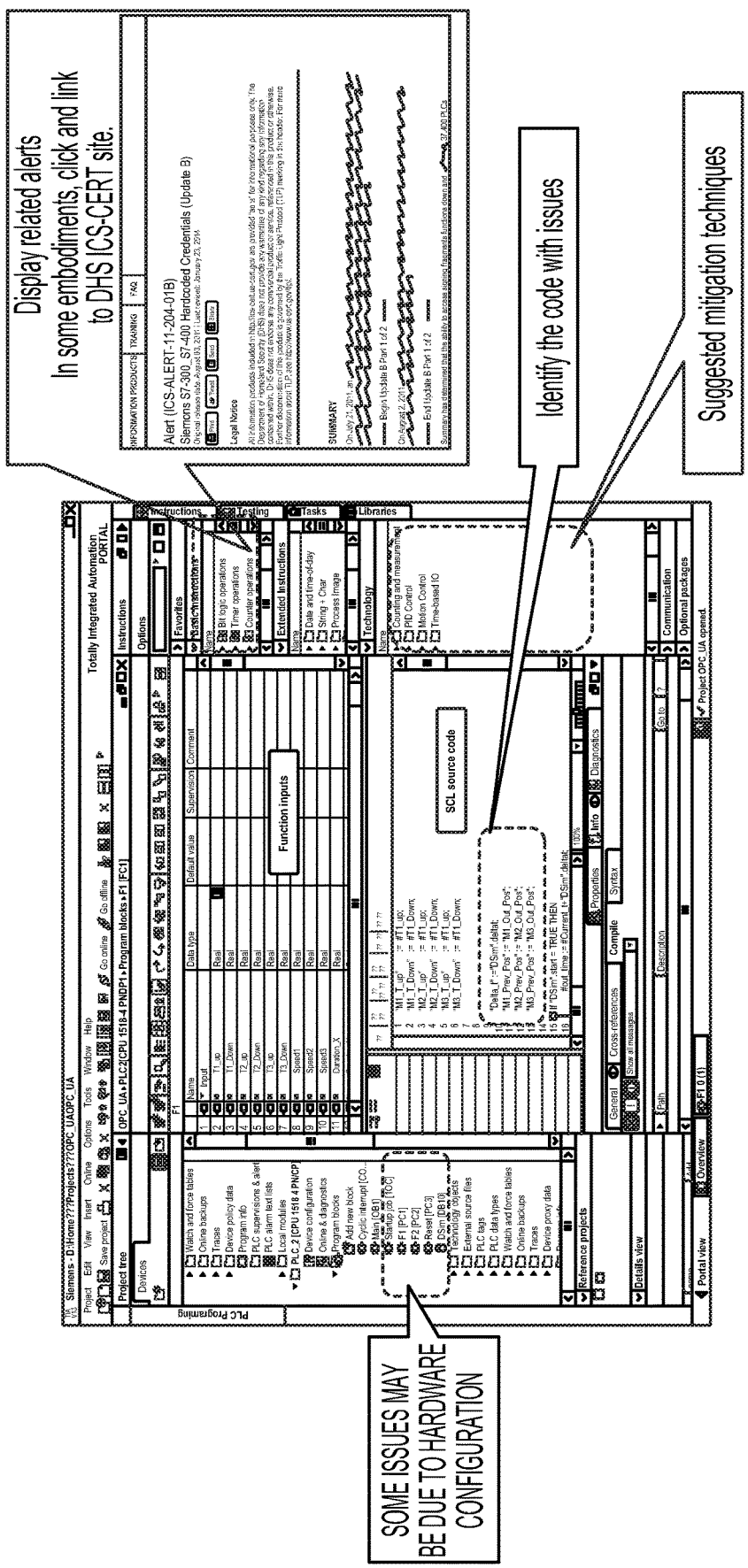
FIG. 4 shows an example of how the IDE may display information related to security vulnerabilities.

FIG. 4 shows an example of how the IDE 215 may display information. In this example, the IDE 215 is the Siemens Totally Integrated Automation (TIA) Portal™; however it should be understood that the general concepts presented in FIG. 4 may be applied to any IDE providing similar functionality. The IDE shown in FIG. 4 is a multi-panel application. The leftmost panels show hardware configuration information. The center panels show the source code editor which, in this example, displays function inputs and Structured Control Language (SCL) source code. The rightmost panel displays vulnerability-related information received from the Engineering Security Vulnerability Identification Client 215A.

The top portion of the rightmost panel in FIG. 4 shows vulnerability alerts. As shown in the figure, clicking on an alert may cause a browser to open a related webpage (e.g., DHS ICS-CERT webpage). In other embodiments, other techniques may be used to display vulnerability-related information. For example, in one embodiment, clicking on an alert may cause a modal text box to appear describing the vulnerability. The bottom portion of the rightmost panel shows all the vulnerabilities associated with the application for quick navigation (e.g., when the source code is several pages long). The rightmost panel may also show suggested mitigation techniques for addressing the vulnerabilities. Clicking an individual mitigation technique causes the mitigation techniques to be immediately displayed. For example, a modal text box may display the mitigation technique. Alternatively, in some embodiments, the Engineering Security Vulnerability Identification Client 215A is deeply integrated into the source code editor such that the Engineering Security Vulnerability Identification Client 215A can highlight the code with issues in the editor itself and provide suggested code edits that would address the vulnerability. The user can then choose to accept or reject the changes. Any issues due to the hardware configuration may be similarly identified and presented to the user through the IDE 215. These can be reviewed by the user and when fixed, or marked as reviewed, they disappear from the list.

Figure 5:
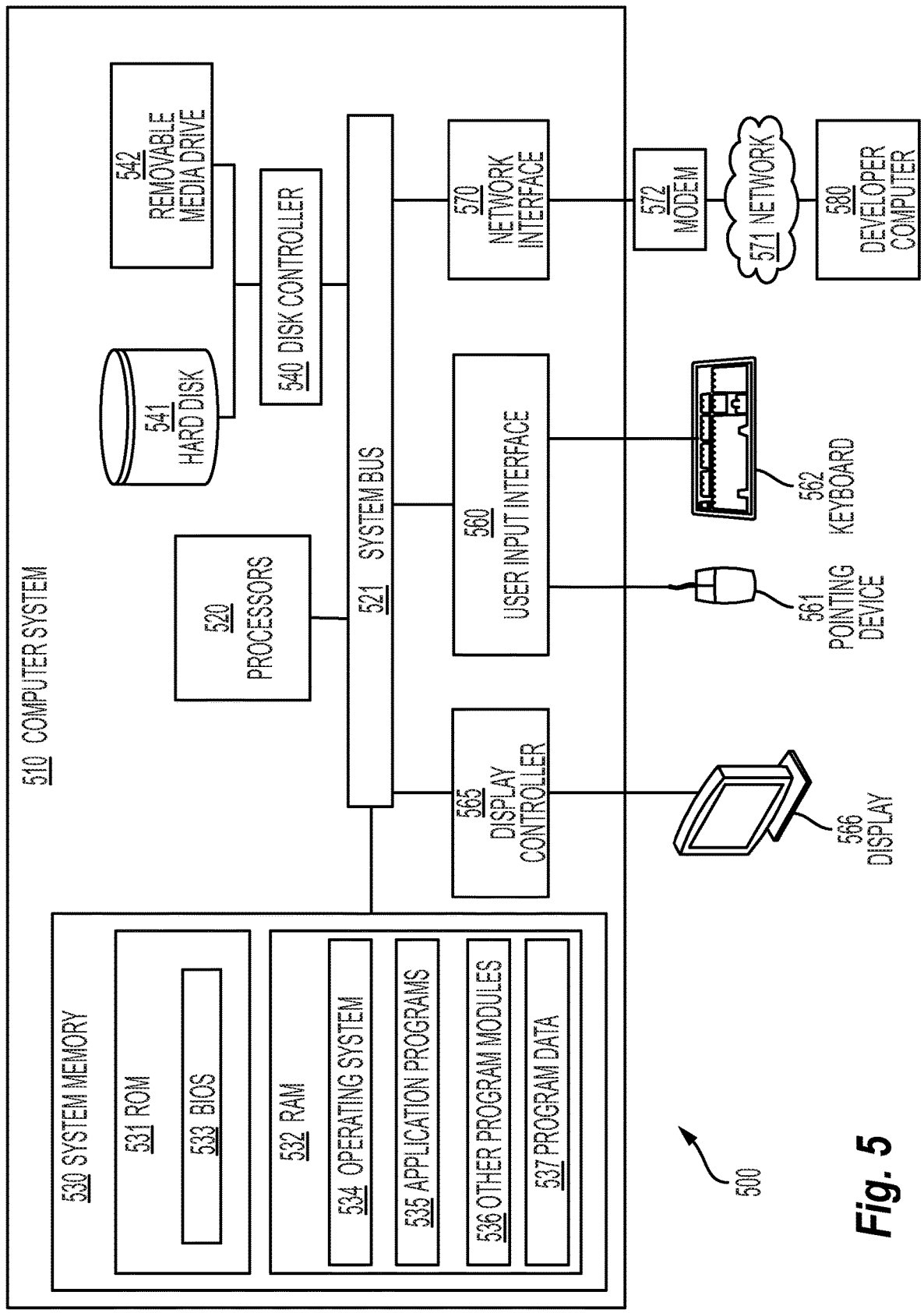
FIG. 5 illustrates an exemplary computing environment within which an engineering security vulnerability identification service may execute.

FIG. 5 illustrates an exemplary computing environment 500 within which the Engineering Security Vulnerability Identification Service 205 may execute. The computing environment 500 includes computer system 510, which is one example of a computing system upon which embodiments of the invention may be implemented. Computers and computing environments, such as computer system 510 and computing environment 500, are known to those of skill in the art and thus are described briefly herein.

As shown in FIG. 5, the computer system 510 may include a communication mechanism such as a system bus 521 or other communication mechanism for communicating information within the computer system 510. The computer system 510 further includes one or more processors 520 coupled with the system bus 521 for processing the information. The processors 520 may include one or more central processing units (CPUs), graphical processing units (GPUs), or any other processor known in the art.

The computer system 510 also includes a system memory 530 coupled to the bus 521 for storing information and instructions to be executed by processors 520. The system memory 530 may include computer readable storage media in the form of volatile and/or nonvolatile memory, such as read only memory (ROM) 531 and/or random access memory (RAM) 532. The system memory RAM 532 may include other dynamic storage device(s) (e.g., dynamic RAM, static RAM, and synchronous DRAM). The system memory ROM 531 may include other static storage device (s) (e.g., programmable ROM, erasable PROM, and electrically erasable PROM). In addition, the system memory 530 may be used for storing temporary variables or other intermediate information during the execution of instructions by the processors 520. A basic input/output system (BIOS) 533 contains the basic routines that help to transfer information between elements within computer system 510, such as during start-up, may be stored in ROM 531. RAM 532 may contain data and/or program modules that are immediately accessible to and/or presently being operated on by the processors 520. System memory 530 may additionally include, for example, operating system 534, application programs 535, other program modules 536 and program data 537. The application programs 535 may include, for example, the one or more executable applications corresponding to the Engineering Security Vulnerability Identification Service 205.

The computer system 510 also includes a disk controller 540 coupled to the system bus 521 to control one or more storage devices for storing information and instructions, such as a hard disk 541 and a removable media drive 542 (e.g., compact disc drive, solid state drive, etc.). The storage devices may be added to the computer system 510 using an appropriate device interface (e.g., a small computer system interface (SCSI), integrated device electronics, Universal Serial Bus (USB), or FireWire).

The computer system 510 may also include a display controller 565 coupled to the bus 521 to control a display 566, such as a liquid crystal display (LCD), for displaying information to a computer user tasked with programming or maintaining the Engineering Security Vulnerability Identification Service 205. The computer system includes an input interface 560 and one or more input devices, such as a keyboard 562 and a pointing device 561, for interacting with a computer user and providing information to the processors 520. The pointing device 561 may be, for example, a mouse or a pointing stick for communicating direction information and command selections to the processors 520 and for controlling cursor movement on the display 566. The display 566 may provide a touch screen interface which allows input to supplement or replace the communication of direction information and command selections by the pointing device 561.

The computer system 510 may perform a portion or all of the processing steps of embodiments of the invention in response to the processors 520 executing one or more sequences of one or more instructions contained in a memory, such as the system memory 530. Such instructions may be read into the system memory 530 from another computer readable medium, such as a hard disk 541 or a removable media drive 542. The hard disk 541 may contain one or more datastores and data files used by embodiments of the present invention. Datastore contents and data files may be encrypted to improve security. The processors 520 may also be employed in a multi-processing arrangement to execute the one or more sequences of instructions contained in system memory 530. In alternative embodiments, hardwired circuitry may be used in place of or in combination with software instructions. Thus, embodiments are not limited to any specific combination of hardware circuitry and software.

As stated above, the computer system 510 may include at least one computer readable medium or memory for holding instructions programmed according to embodiments of the invention and for containing data structures, tables, records, or other data described herein. The term "computer readable medium" as used herein refers to any medium that participates in providing instructions to the processor 520 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 541 or removable media drive 542. Non-limiting examples of volatile media include dynamic memory, such as system memory 530. Non-limiting examples of transmission media include coaxial cables, copper wire, and fiber optics, including the wires that make up the bus 521. Transmission media may also take the form of acoustic or light waves, such as those generated during radio wave and infrared data communications.

When used in a networking environment, computer system 510 may include modem 572 for establishing communications over a network 571 with a Developer Computer 580 executing the Engineering Security Vulnerability Identification Client 215A. Modem 572 may be connected to bus 521 via user network interface 570, or via another appropriate mechanism. It should be noted that, although the Developer Computer 580 is illustrated as being connected to the computer system 510 over the network 571 in the example presented in FIG. 5, in other embodiments of the present invention, the computer system 510 may be directly connected to the Developer Computer 580. For example, in one embodiment, the computer system 510 and the Developer Computer 580 are co-located in the same room or in adjacent rooms, and the devices are connected using any transmission media generally known in the art.

Network 571 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 510 and other computers (e.g., developer computer 580). The network 571 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 571.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Unless stated otherwise as apparent from the following discussion, it will be appreciated that terms such as "applying," "generating," "identifying," "determining," "processing," "computing," "selecting," or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A "graphical user interface" (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f) the element is expressly recited using the phrase "means for."

We claim:

1. A system for checking project security vulnerabilities for automation system design, the system comprising:
   a security database storing descriptions of known software vulnerability related to an automation system;
   an Internet crawler application configured to systematically browse the Internet to find new software vulnerability related to the automation system and index the new software vulnerability into the security database;
   a security service application configured to:
      retrieve, from the security database, one or more potential software vulnerabilities related to a hardware/software configuration of the automation system;
      identify one or more policies related to the potential vulnerabilities wherein each policy describes a potential vulnerability and action to be performed in response to detection of the potential vulnerabilities;
      apply the policies to the hardware/software configuration and software code corresponding to an automation application to identify one or more actual vulnerabilities; and
      displaying the one or more actual vulnerabilities to a user.

2. The system of claim 1, wherein the Internet crawler application is further configured to (a) retrieve webpages from one or more external websites detailing the new software vulnerability, and (b) apply one or more machine learning algorithms to extract information related to the new software vulnerability from the webpages.

3. The system of claim 2, wherein the information related to the new software vulnerability comprises one or more of a (a) name of product, (b) a version number related to the product, (c) a vulnerability type, (d) a vulnerability identifier, and (e) a named entity linking.

4. The system of claim 2, wherein the external websites are selected from a predetermined list of websites.

5. The system of claim 2, wherein the external websites are identified based on an Internet search using keywords comprising one or more of a (a) name of product, (b) a version number related to the product, (c) a vulnerability type, (d) a vulnerability identifier, and (e) a named entity linking.

6. The system of claim 2, wherein the security service application is further configured to:
receive feedback from the user in response to display of the one or more actual vulnerabilities,
wherein the one or more machine learning algorithms are retrained based on the feedback.

7. The system of claim 1, wherein the policies identify one or more possible mitigation techniques for addressing the one or more actual vulnerabilities, and the security application is further configured to display the possible mitigation techniques.

8. The system of claim 1, wherein the one or more actual vulnerabilities are displayed to the user in an Integrated Development Environment (IDE).

9. The system of claim 8, wherein at least one of the actual vulnerabilities is directed to a particular line of the software code and the security application displays the actual vulnerability in-line with the particular line of the software code.

10. The system of claim 8, wherein at least one of the actual vulnerabilities is directed to a particular line of the software code and the security application displays the actual vulnerability with a line number of the particular line of the software code.

11. The system of claim 8, wherein the security service application is further configured to:
while applying the policies to the hardware/software configuration and the software code corresponding to the automation application, displaying a measurement in the IDE indicating a degree to which the software code has been tested for the potential vulnerabilities.

12. A computer-implemented method for checking project security vulnerabilities for automation system design, the method comprising:
receiving, from an IDE, a description of a hardware/software configuration of the automation system and software code corresponding to an automation application;
retrieving, from a security database, one or more potential software vulnerabilities related to the hardware/software configuration;
identifying one or more policies related to the potential vulnerabilities, wherein each policy describes a potential vulnerability and one or more actions that may be performed to mitigate the potential vulnerabilities;
applying the policies to the hardware/software configuration and the software code to identify one or more actual vulnerabilities; and
displaying the one or more actual vulnerabilities in the IDE.

13. The method of claim 12, wherein (a) the software code is received from the IDE in segments as it is entered, (b) the policies are applied to each segment individually, (c) the actual vulnerabilities are displayed in the IDE immediately after the policies are applied.

14. The method of claim 13, wherein each segment corresponds to a line of the software code.

15. The method of claim 13, wherein each segment corresponds to a function block included in the software code.

16. The method of claim 13, further comprising:
while applying the policies to the hardware/software configuration and software code, displaying a measurement in the IDE indicating a degree to which the software code has been tested for the potential vulnerabilities.

17. The method of claim 12, further comprising:
displaying one or more possible mitigation techniques to address the actual vulnerabilities in the IDE.

18. An Integrated Development Environment (IDE) system comprising:
an IDE comprising:
a first graphical user interface (GUI) component allowing specification of a hardware/software configuration of an automation system, and
a second GUI component allowing entry of software code corresponding to an automation application;
a client application integrated with the IDE and configured to:
transfer, to a remote security service application, the hardware/software configuration and the software code,
receive, from the remote security service application, an identification of one or more vulnerabilities present in the software code, and
display the one or more vulnerabilities in the IDE.

19. The IDE system of claim 18, wherein the one or more vulnerabilities are displayed in a third GUI component displayed adjacent to the second GUI component.

20. The IDE system of claim 18, wherein the client application is further configured to:
receive, from the remote security service application, an identification of one or more mitigation techniques for addressing the vulnerabilities present in the software code, and
display the mitigation techniques in the IDE.

* * * * *